(12) United States Patent
Haller et al.

(10) Patent No.: US 6,918,119 B2
(45) Date of Patent: Jul. 12, 2005

(54) METHOD AND SYSTEM TO IMPROVE USAGE OF AN INSTRUCTION WINDOW BUFFER IN MULTI-PROCESSOR, PARALLEL PROCESSING ENVIRONMENTS

(75) Inventors: Wilhelm E. Haller, Remshalden (DE); Jens Leenstra, Bondorf (DE); Rolf Sautter, Bondorf (DE); Dieter Wendel, Schoenaich (DE); Friedrich-Christian Wernicke, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 09/838,068

(22) Filed: Apr. 19, 2001

(65) Prior Publication Data

US 2001/0052055 A1 Dec. 13, 2001

(30) Foreign Application Priority Data

Apr. 20, 2000  (EP) .............................. 00108698

(51) Int. Cl.[7] .............................. G06F 3/00
(52) U.S. Cl. ..................................... 719/312
(58) Field of Search ............... 704/102, 100, 704/106, 312, 313, 314, 318; 718/100, 102, 106, 107; 719/312, 313, 314, 318; 710/56, 52; 712/238

(56) References Cited

U.S. PATENT DOCUMENTS

| | | | | |
|---|---|---|---|---|
| 5,584,037 A | * | 12/1996 | Papworth et al. | ............. 712/23 |
| 5,584,038 A | | 12/1996 | Papworth et al. | ........... 395/800 |
| 5,627,984 A | | 5/1997 | Gupta et al. | ................. 395/392 |
| 5,740,393 A | | 4/1998 | Vidwans et al. | ............ 395/391 |
| 5,812,812 A | * | 9/1998 | Afsar et al. | .................. 712/216 |
| 5,923,900 A | * | 7/1999 | Soell et al. | .................... 710/40 |
| 5,930,491 A | * | 7/1999 | Hilgendorf et al. | ......... 712/209 |
| 6,138,231 A | * | 10/2000 | Deosaran et al. | ........... 712/216 |
| 6,349,380 B1 | * | 2/2002 | Shahidzadeh et al. | ....... 712/211 |
| 6,438,651 B1 | * | 8/2002 | Slane | ......................... 711/118 |
| 6,505,293 B1 | * | 1/2003 | Jourdan et al. | ............. 712/217 |
| 6,594,754 B1 | * | 7/2003 | Jourdan et al. | ............. 712/217 |
| 6,625,723 B1 | * | 9/2003 | Jourday et al. | ............. 712/217 |

OTHER PUBLICATIONS

Farrell, et al., "Issue Logic for a 600–MHz Out–of–Order Execution Microprocessor," IEEE Journal of Solid–State Circuits, vol. 33, No. 5, May 1998, pp. 707–712.

Palacharla et al., "Complexity–Effective Superscalar Processors," ISCA ' 97 Denver, CO, USA, 1997 ACM 0–89791–901–7/97/0006, pp. 206–218.

Gaddis, et al., "A 56–Entry Instruction Reorder Buffer," ISSCC96/Session 13/Microprocessors/Paper FP 13.2, 1996 IEEE International Solid–State Circuits Conference, pp. 212–213, 447.

* cited by examiner

Primary Examiner—John Follansbee
Assistant Examiner—Haresh Patel
(74) Attorney, Agent, or Firm—Lynn L. Augspurger, Esq.; Blanche E. Schiller, Esq.; Heslin Rothenberg Farley & Mesiti P.C.

(57) ABSTRACT

The present invention relates to a method and system for determining the status of each entry in an instruction window buffer in multi-processor, parallel processing environments. A combinatorial circuit, which automatically generates active instruction window status information, is added to the buffer itself. This status information is used by a plurality of processes like renaming registers and issuing and committing instructions as an output associated with a respective buffer entry.

16 Claims, 3 Drawing Sheets

METHOD AND SYSTEM TO IMPROVE USAGE OF AN INSTRUCTION WINDOW BUFFER IN MULTI-PROCESSOR, PARALLEL PROCESSING ENVIRONMENTS

PRIOR FOREIGN APPLICATION

This application claims priority from European patent application number 00108698.2, Apr. 20, 2000, which is hereby incorporated herein by reference in its entirety.

1. Technical Field

The present invention relates to storage devices in computer systems and in particular, it relates to an improved method and system for operating system storage devices, and in particular to buffer devices which are used in a circulating manner.

2. Background Art

Although the present invention has a broad field of application, as improving or optimizing buffer storage strategies is a very general purpose in computer technology, it will be described and discussed with prior art technology in a special field of application, namely in context of utilization of an instruction window buffer, further referred and abbreviated to IWB which is present in most modern computer systems in order to enable a parallel program processing of instructions by a plurality of processing units. Such processors are referred to herein as out-of-order processors.

In many modern out-of-order processors such a buffer is used to contain all the instructions and/or register contents before the calculated results can be committed and removed from the buffer. When results were calculated speculatively beyond the outcome of a branch instruction, they can be rejected once the branch prediction becomes wrong by cleaning these entries from the buffer and overwriting them with new correct instructions. This is one prerequisite for the out-of-order processing. One main parameter influencing the performance of the processors is the buffer size: A big buffer can contain many more instructions and results and therefore allows more out-of-order processing. One design objective therefore is to have a big buffer. This, however, stays in conflict with other design requirements such as cycle time, buffer area, etc.

When, for example, the buffer size is dimensioned too large then the efforts required to manage such a large plurality of storage locations decreases the performance of the buffer. Furthermore, increased buffer size implies an increased signal propagation delay. Thus, generally, any performance-improved buffer storage method has to find a good compromise between the parameters buffer size, storage management and therewith storage access speed.

In U.S. Pat. No. 5,584,037 titled 'Entry Allocation In A Circular Buffer', which is hereby incorporated herein by reference in its entirety, the instructions stored in a reservation station used like the before mentioned IWB are addressed via a bitstring where the 1 to 0 and 0 to 1 transitions of the active window bit stream indicate the beginning and the end of the active window. The active window bit is ON when an entry contains valid data. Otherwise it is switched OFF. The IWB is a circular buffer hence all entries containing valid data are consecutive and therefore the transition of the active window bit from 0 to 1 and 1 to 0 identifies the in- and out-pointer as long as at least one entry is kept free. When the buffer is empty (no active bit at all) an arbitrary entry is written.

The disadvantage lies in the fact that for performance purposes, this prior art way of operating such a buffer based on a serialization of reading or writing the IWB with respective determination of the respective state of each instruction is too slow, in particular, when each entry must be accessible to a plurality of read/write requesters which define or read the state of the buffered entries, e.g., instructions. Furthermore one entry must be kept free in the prior art approach to assure that there is still a transition in the active window bits of the IWB. This reduces the utilization of the IWB.

SUMMARY OF THE INVENTION

It is thus an objective of the present invention to increase the efficiency of buffer utilization, i.e., to increase its performance.

This objective of the invention is achieved by the features stated in enclosed independent claims. Further advantageous arrangements and embodiments of the invention are set forth in the respective subclaims.

According to basic features of the present invention an "active bit" is associated to each IWB entry and the state of this active bit is generated by combinatorial logic associated with the entry. Thus, a bit vector is generated. Each active bit represents a concentrated form of entry-related validation information which is evaluable for the status of each entry relative to the further processing of the entry by the one or more processes accessing the buffer entries. The presence of an active window bit vector prevents the necessity to check sequentially for validity of the instruction.

The state of these active bits is generated based on the flow of instructions in the buffer that update the in-pointer and out-pointer value.

A second, preferred inventional aspect is based on a new approach to decentralize the computing work required for evaluating the validation information (AWB) of the entries, i.e., to provide for autonomous determination of the relevant status information by the respective entry itself. The approach stands in a sharp contrast of any prior art buffer management for managing the desired access to read requesters or from write requesters which traditionally reads the required control information from multiple locations of the buffer, makes a synthesis and an evaluation of the control information at a central location by a dedicated processing unit and uses the evaluation results for 'remote controlling' the respective plurality of buffer entry accesses.

The inventional approach, however, saves data transfers and complexity of the overall processing because a simple additional circuit is added to the buffer itself which automatically generates the active window status information required for the plurality of processes like renaming registers, issuing and committing instructions, as an output associated with a respective entry and automatically generated when an IN- and OUT pointer pair specific for each of the plurality of processes is input in the circuit. In particular, the automatic status generation is very advantageous against prior art where the new status information had to be derived from the status information of the preceding status stored in latches because of cycle time requirements.

Each entry stores its actual buffer index. By a logical circuit comprising a comparison between the index and the respective relation to the respective current IN and OUT pointer values an entry is made 'intelligent' in the sense that it knows if it belongs to the valid entries for which the active window bit needs to be ON, i.e. entries between the OUT and IN pointer with possible wrap-around.

According to a preferred aspect of the present invention this is basically achieved by providing and managing validation information specific for each of the k processes and indicating if a respective entry can be subjected to a respective process, or not. This is done preferably by providing for each entry a circuit comprising combinatorial logic which automatically calculates the status for the respective process to do or already done.

Thus, a novel method is disclosed in which the active bits are generated cellular for each IWB entry. Each cell contains a greater-equal compare that is used to calculate, based on an in- and an out-pointer, if the entry is part of the active window. Thereby different in- and out-pointer values are applied for the different IWB macros to match the active window to the macro protocol requirements. As a further advantage there are no undetermined cycles because the validation information can be obtained before the end of the cycle in which a respective value pair of the IN- and OUT pointer is input to the combinatorial logic.

Generally, the inventional concepts are applicable for any buffer management implementing piece of hardware, and in particular for wrap-around buffers, as well. Further, any buffer used for queue management can be improved by applying the inventional concepts.

BRIEF DESCRIPTION OF THE DRAWINGS

The present invention is illustrated by way of examples and is not limited by the shape of the figures of the accompanying drawings in which.

BEST MODE FOR CARRYING OUT THE INVENTION

IWBs typically hold 16 to 64 instructions in today's implementations. The number will grow in future implementations since it is preferable to hold as much instructions as possible. However in the majority of the time only a fraction of the complete buffer will be filled up with "active" entries, i.e., valid instructions to be executed and not yet ready to be overwritten by a new entry.

Figure 2:
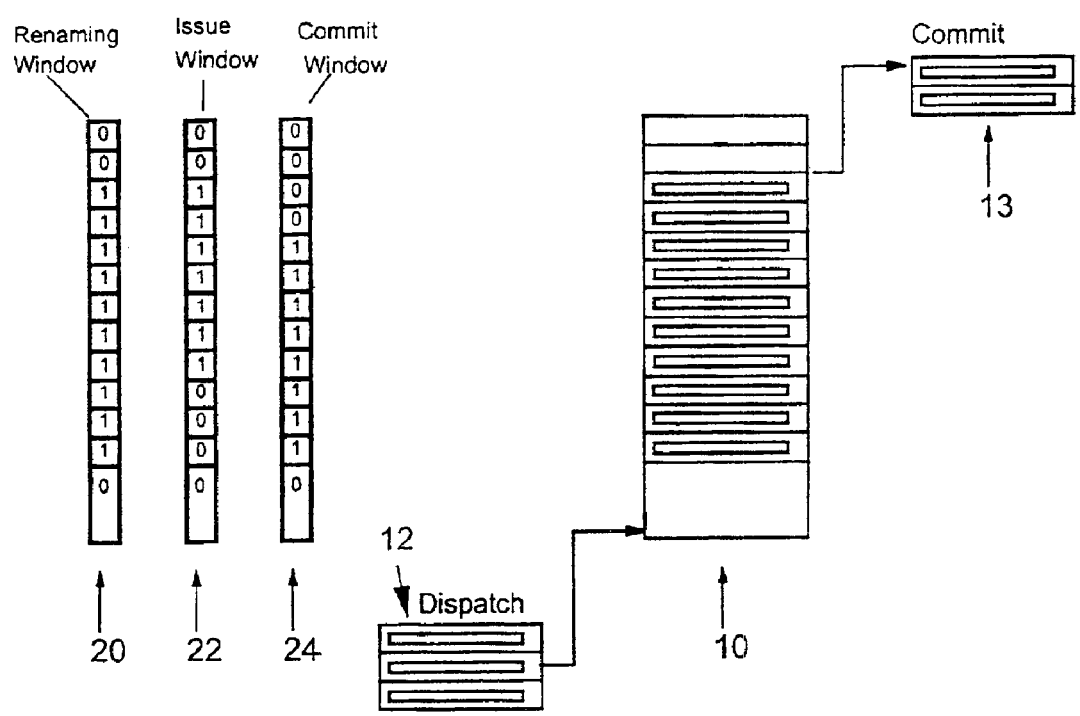
FIG. 2 is a schematic representation showing further aspects and illustrating elements used during the inventional method according to a preferred embodiment thereof applied to operation of an instruction window buffer.

The determination if an entry belongs to the "active window" is dependent on many processes as for example dispatching new instructions into the IWB, purging or partially purging the buffer after a mispredicted branch and retiring instructions. The active window is not uniform over the different fields and processes within the IWB. There are three states (FIG. 2).

1. Active Window for Renaming

This window spans all instructions from the youngest one dispatched, to the oldest instruction for which the result data has not yet been written back in the architected register (ARA).

2. Active Window for Issue Spans from youngest instruction with renaming complete, to the oldest instruction not committed.

3. Commit Window Spans from youngest instruction dispatched, to the oldest instruction not committed.

The active window increases within one cycle on the "IN" point by zero to the maximum of instructions dispatched to the buffer and decreases on the "OUT" point by zero up to the maximum of instructions committed. For efficiency the buffer is used in wrap around fashion.

Figure 1:
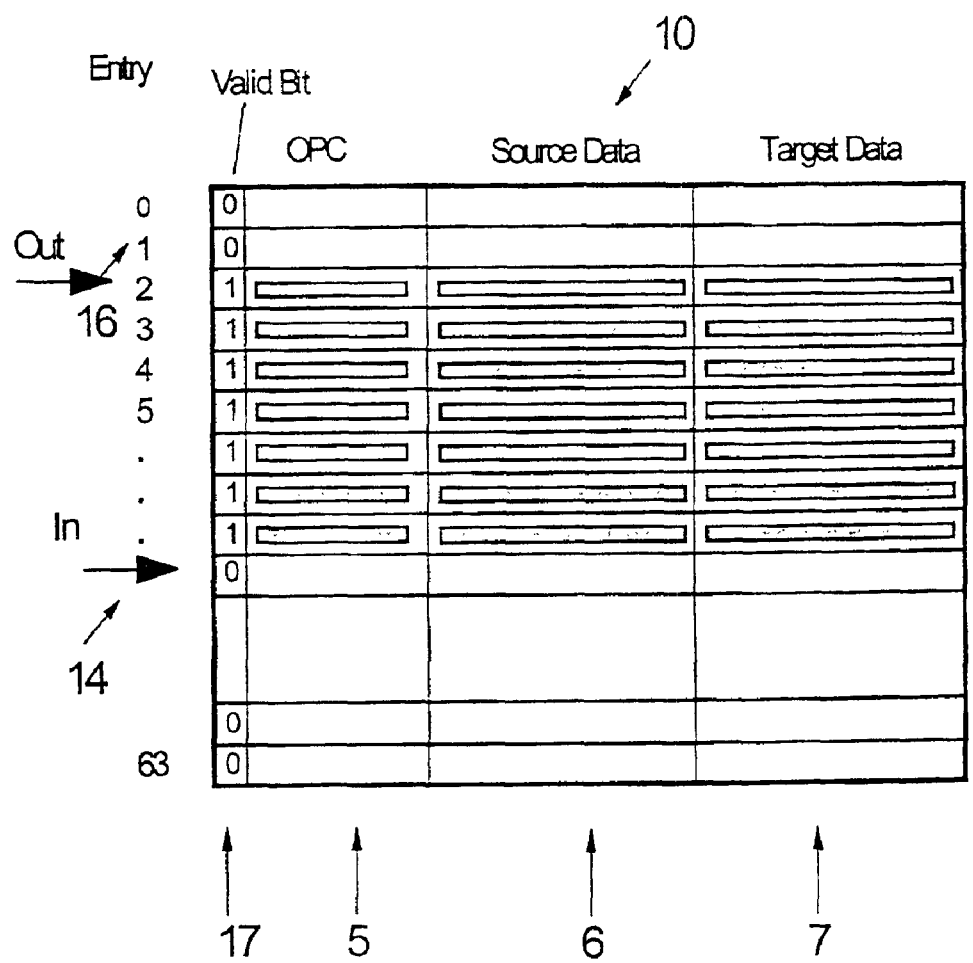
FIG. 1 is a schematic representation showing basic aspects and elements used during the inventional method according to a specific embodiment thereof applied to operation of an instruction window buffer.

With general reference to the figures and with special reference now to FIG. 1 a buffer 10 memory has a plurality of 64 entries 0 ... 63. The entries are indexed subsequently according to their position in the buffer array, i.e. entry 0 has the index 0, entry 1 has the index 1 etc. The indexes are bit strings comprised of the number of bits necessary to indicate the binary value of the index.

Each entry holds operation code data, source data in respective fields 5, 6 and can be filled if required with target data resulting from an execution of the associated instruction. These are stored in a field 7 each. In addition, further control and status information, not shown in FIG. 1 can be allocated to each entry.

For each entry the buffer 10 comprises a valid/invalid bit in a field 17. The total of them forms an 'active bit string' illustrated by a vertical extension in the drawing. During operation active entries are characterized by having the active window bit (AWB) switched to ON, in the example '1' which can be seen in the very first column on the left margin of the active window buffer in FIG. 1.

During program operation program instructions are dispatched from a dispatching unit into the buffer 10. In order to maintain a sequence of active entries without any gaps between them a new instruction is entered into the buffer 10 at the entry identified by the In-pointer index. The entry location is marked by an IN-pointer 14.

Correspondingly, an OUT-pointer 16 marks the oldest instruction, i.e. the instruction which is to be retired, i.e. removable from the buffer. This is the location identified by the OUT-Pointer value. When the In-Pointer and Out-Pointer have the same value the wrap bit of the pointers will decide if the buffer is full or empty. In case the wrap bit is set the buffer is full, in case the wrap bit is not set the buffer is empty.

When the result data of an instruction is read out from the IWB and stored in the ARA the respective entry is decided to be removable from the buffer 10, i.e., the entry is left for being overwritten by the next one. Thus, the active window bit is switched from 1 to 0. The state of these active bits is thus updated based on the flow of instructions in the buffer.

According to the chosen case of IWB operation the processes changing the active window bits are then dispatch, commit, purge and partial purge.

Under the assumption that an entry is active if its active window bit=1 the following information can be advantageously be managed:

1. Dispatch of New Instructions to the IWB

The new instruction is dispatched to the location the In-Pointer points to. If more than one instruction is dispatched, the instructions are written in consecutive order starting at the In-Pointer. The In-Pointer is incremented by the number of new instructions dispatched to the IWB. In consequence the window bits of the new entries turn ON since their position is between the In-Pointer and the Out-Pointer.

2. Retiring Instructions from the IWB

The Out-Pointer points to the oldest non-committed entry in the buffer. The Out-Pointer is incremented by the number of instructions committed in the cycle. The window bits not belonging to the active instruction stream anymore are reset to zero since their position is smaller than the out-pointer.

3. Complete Purge

In Pointer=Out Pointer=0, Wrap=0. The result is that all window bits of the IWB turn to 0.

4. Partial Purge

The entry position (index) is sent together with the instruction to the execution units. In case the IWB has to be purged partially because of a mispredicted branch, the In-Pointer is set to the index following the entry of the mispredicted branch instruction. All window bits from the instruction following the mispredicted branch to the end of the window are reset to zero.

5. IWB Full

The IWB is full if In-Pointer=Out-Pointer and wrap=1. No action is required on window bits.

With reference to FIG. 2 and according to a preferred embodiment of the present invention and disclosing a second preferred aspect thereof an instruction window buffer 10 can be fed by instructions from the dispatching unit 12 and feed them to a commit unit 13 after out-of-order execution as it was the case in the example given before.

In contrast thereto, however, three different bit strings 20, 22 and 24 are maintained which serve to determine the status of each instruction in view of a respective one of three relevant processes which work on a respective instruction each during out-of-order processing. Those three different bit strings are referred to renaming window 20, issue window 22, and commit window 24.

The active window bit 17 which—in the example given in FIG. 1—has a quite general nature because it refers generally to all three relevant processes, is now split up into three different status bits each specifically reflecting the progress of an instruction relative to the respective specific process—renaming, issuing, and committing. Thus, the general bit status 17 can be omitted if not required by any other processing unit cooperating with the buffer 10.

Consequently, three independent pairs of In- and Out-Pointers are the inputs for generating the specific process windows 20, 22, and 24:

In/Out-Pointer_for_Commit[0 . . . 5],
In/Out-Pointer_for_Rename[0 . . . 5], and
In/Out-Pointer_for_Issue [0 . . . 5].
Some contents of the pointers may be identical, e.g., the In_Pointer_for_Issue and In_Pointer_for_Commit.

Thus, the basic aspect of the active window bit vector as described before is basically maintained but concurrently refined, i.e., sophisticated by additionally managing the same number of pointer pairs as there are processes working on the buffer entries contents.

Figure 3:
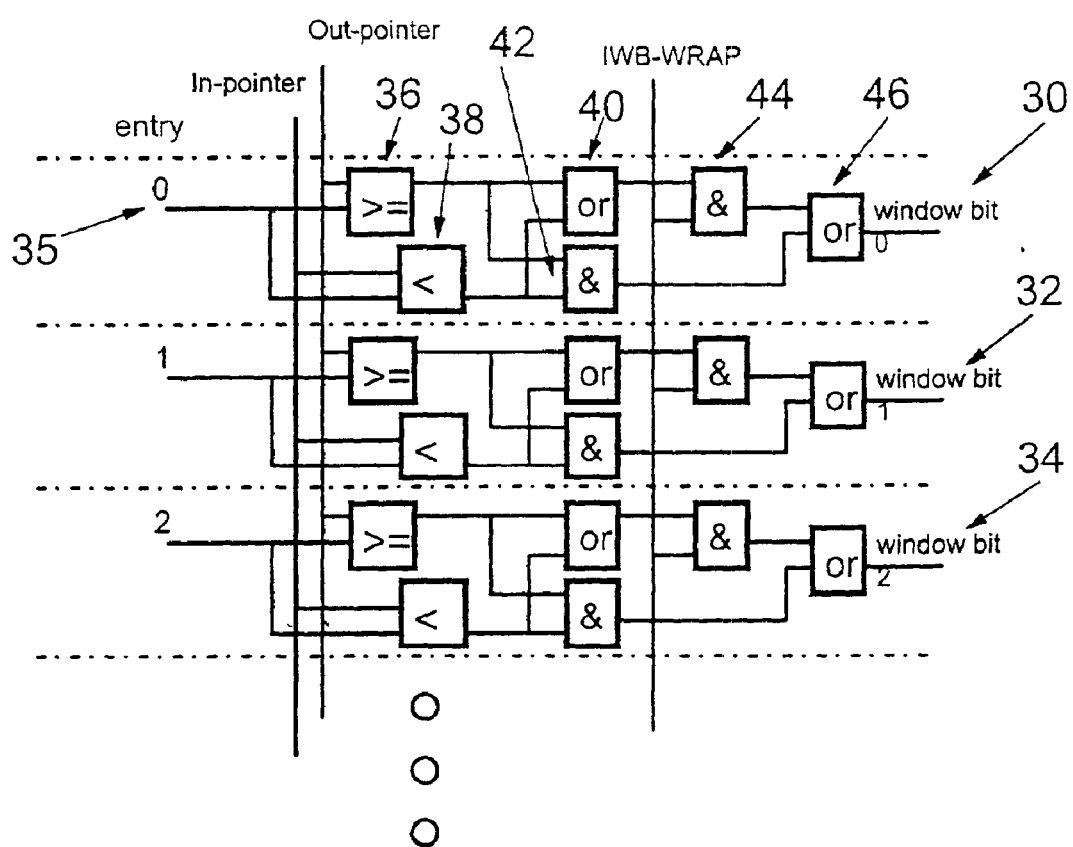
FIG. 3 is a block diagram illustrating a combinatorial logic circuit used for generating entry-related validation information.

Further, and with additional reference to FIG. 2 the vectors 20, 22, and 24 are not implemented as a latch chain which has to be written and to be read to maintain the information, but instead, the respective active/not-active bits associated with the three different bit vectors are generated cellular for each IWB entry by a respective combinatorial logic 30, 32, 34 which is illustrated exemplarily in FIG. 3 for three different entries 0, 1 and 2—and for one respective window, as for example the issue window. The bit generation for the other windows is performed basically in the same way but is not explicitly shown in the drawing in order to improve its clarity.

The determination of the state of an entry is done by a greater-equal compare 36 and a less compare 38 of the physical entry position 35 with the In- and Out-pointer.

In the non-wrap-around case a given entry belongs to the active window if the entry position is greater or equal to the Out-pointer and smaller than the In-pointer. The greater-equal compare 36 output is set to 1 for all entries that are greater equal than the Out-Pointer since it compares the IWB entry number with the Out-Pointer value. The less-compare 38 output is set to 1 for all IWB entries that are smaller than the In-Pointer value since it compares the entry number and the In-Pointer value. The output of the AND gate 42 that has the compare outputs of 36 and 38 as inputs will therefore be a '1' for all entries that are between the In- and the Out-Pointer and therefore the desired window bit string is generated on the outputs of the OR gates 46.

In the wrap-around case, the active entries are all entries that are smaller than the In-Pointer and all entries that are larger-equal to the Out-Pointer. Hence these bits need to be set. The greater-equal compare again generates a '1' at the output for all entries that are larger-equal to the Out-Pointer. Furthermore, the less-compare 38 generates a '1' on its output for all entries that are smaller than the In-Pointer. So when the output of 36 and 38 are ORed by 40 in each IWB entry and the IWB-WRAP signal is ON for the AND gate 44, then the correct window bit string is generated on the window bit outputs by 46.

When the In-Pointer and the Out-Pointer are equal the IWB-Wrap input defines if the IWB is full (case IWB–Wrap=1) or empty (case IWB–Wrap=0). Hence all or none of the active window bits have to be set. Since the compare gates 36 and 38 now have the same input signals for each entry and compare gate 36 is a greater-equal compare and the 38 compare is a less compare the output of 36 or 38 will be set_but never both are set at the same time. Hence the output of 42 will be '0' for each entry and the output of the OR 40 will be '1' for each entry. Hence if IWB-Wrap is '1' all window bits are set according to the IWB-Full case and when IWB–Wrap=0 all window bits are '0' according to the IWB-empty case.

These comparisons are done in parallel for every entry.

In more detail and with reference to the processes the entries are subjected to the manipulation of the state of the respective status bits is done in the following manner given for the IWB in a non-wrap case.

1. Dispatch

The new instruction is dispatched to the location the In-pointer 14 points to. If more than one instruction is dispatched, the instructions are written in consecutive order starting at the In-pointer. Then, the In-pointer is incremented by the number of new instructions dispatched to the IWB, i.e., it is moved from top to down. In the In-wrap case, i.e., when the In-pointer window wraps around the In-pointer moves from the last entry back to the first entry and from there down again. In consequence the window bits of the renaming window of the new entries turn ON since their position is smaller than the In-pointer.

The commit window in-pointer as the issue window in-pointer is incremented in the cycle when the entry is to be taken into account by the commit, respectively issue, process.

2. Commit

The Out-pointer 16 points to the oldest non-comitted entry in the buffer. The Out-pointer is incremented by the number of instructions committed in the cycle, e.g., it is moved from top to down. In the Out-wrap-case the Out-pointer moves from the last entry back to the first entry and from there down again. The commit window bits not belonging to the active instruction stream anymore reset to zero since their position is smaller than the out pointer. The Out-Pointer for the rename window will include the committed instructions until they have been written by the commit process into the architectural register file ARA. For example, if this takes one cycle, then the Out-Pointer of the renaming window will be overwritten with the In-Pointer of the commit window with one cycle delay. The issue window Out-Pointer may be set to the Commit Out-Pointer value as well as the Rename window Out-pointer.

3. Purge

For completely purging the buffer 10 the In-pointer value is set equal to the Out-pointer value, IWB–Wrap=0. See the input signal IWB-Wrap in FIG. 3, too. Then all window bits of the IWB turn to '0'.

4. Partial Purge

The entry position given by the above mentioned index is sent together with the instruction to the execution units. In case the IWB has to be purged partially because of a mispredicted branch, the In-pointer is set to the index following the entry of the mispredicted branch instruction. All window bits from the instruction following the mispredicted branch to the end of the window are reset to zero.

5. IWB Full

The IWB is full if the value of the In-pointer equals that one of the Out-pointer and IWB–Wrap=1, see FIG. 3 for the IWB-Wrap signal. All window bits are set.

As should reveal from the foregoing description the different windows 20, 22, and 24 are managed by applying the associated pair of pointers to the specific compare circuits. Thus, every entry "decides" by itself if it belongs to the respective active window. This validation update is done preferably in every cycle. Therefore the desired entry validation information is available in the same cycle the In- and Out-pointers are applied and is available at each physical entry location immediately. Thus, there are no undetermined cycles.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

In particular, the splitting up to provide for a plurality of status windows can be combined or might not be combined with the advantageous feature of applying combinatorial logic as described above because they are independent from each other. Nevertheless, when combined, there is a synergy effect resulting because the additional computing work which would be per se required for handling the plurality of status bits is done in a very quick and simple way and in a decentralized manner.

Further, when applied to buffers other than IWBs it should be understood that the number of active windows maintained is adapted to the number of performance relevant processes working on the buffer entries.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

What is claimed is:

1. A method of operating a buffer memory, the buffer having a plurality of entries, the entries being subject to processing by processes, said method comprising:

generating an active bit string for each of at least one process of said processes, wherein the active bit string comprises status information for the entries, and wherein the status information of an entry of said entries indicates readiness of the entry for further processing by said at least one process; and said generating comprises computing the status information by
(i) comparing an entry index of the entry to an out-pointer to determine whether the entry index is greater than or equal to the out-pointer,
(ii) comparing the entry index of the entry to an in-pointer to determine whether the entry index is less than the in-pointer;
(iii) determining whether a buffer wrap around in said buffer has occurred, and one of the comparing (i) and the comparing (ii) is true, and if so, setting the status information of the entry to a value which indicates said readiness of the entry for further processing by the at least one process; and
(iv) determining whether the comparing (i) and the comparing (ii) are both true, and if so, setting the status information of the entry to a value which indicates said readiness of the entry for further processing by the at least one process.

2. The method of claim 1 wherein the status information of the entry indicates readiness of the entry for further processing by a process associated with the active bit string.

3. The method according to claim 1, wherein computing the status information further comprises maintaining an in-pointer and an out-pointer for each of said at least one process and wherein said comparing (i) utilizes a comparator, and said comparing (ii) utilizes a comparator.

4. The method according to claim 3 wherein said buffer memory operates as an instruction window buffer, which can store processing instructions, and said at least one process is one of a plurality of processes comprising at least two of dispatching new instructions to the instruction window buffer, retiring instructions from said instruction window buffer by a commit process, or purging at least one instruction from said window buffer.

5. The method according to claim 3 for use in managing queues.

6. The method of claim 1, wherein the determining (iii) further comprises inputting a result obtained from the comparing (i) and a result obtained from the comparing (ii) into an OR gate and computing a logical AND of the OR gate's output with an instruction window buffer wrap signal.

7. A buffer storage device having a plurality of entries, the entries being subject to processing by processes, and comprising:

means for generating an active bit string for each of at least one process of said processes, wherein the active bit string comprises status information for the entries, and wherein the status information of an entry of said entries indicates readiness of the entry for further processing by said at least one process; and means for computing the status information by
(i) comparing an entry index of the entry to an out-pointer to determine whether the entry index is greater than or equal to the out-pointer,
(ii) comparing the entry index of the entry to an in-pointer to determine whether the entry index is less than the in-pointer;
(iii) determining whether a buffer wrap around in said buffer has occurred, and one of the comparing (i) and the comparing (ii) is true, and if so, setting the status information of the entry to a value which indicates said readiness of the entry for further processing by the at least one process; and (iv) determining whether the comparing (i) and the comparing (ii) are both true, and if so, setting the status information of the entry to a value which indicates said readiness of the entry for further processing by the at least one process.

8. The buffer storage device of claim 7 wherein the status information of the entry indicates readiness of the entry for further processing by a process associated with the active bit string.

9. The buffer storage device of claim 8 wherein the means for computing the status information further comprises maintaining an in-pointer and an out-pointer for each of said at least one process and wherein said comparing (i) utilizes a comparator, and said comparing (ii) utilizes a comparator.

10. The buffer storage device of claim 7, wherein said buffer storage device further comprises a plurality of means for computing the status information, wherein each of the plurality of means for computing is associated with one of the plurality of entries.

11. The buffer storage device of claim 10, wherein said each of the plurality of means for computing further comprises means for computing the status information associated with each of said of at least one process.

12. A microprocessor device having at least one buffer storage device according to claim 7.

13. A computer system having a microprocessor device according to claim 12.

14. A computer system having a microprocessor device, said microprocessor device having at least one sub-unit, said at least one sub-unit having one or more storage devices, at least one storage device of said one or more storage devices having a plurality of entries, the entries being subject to processing by processes, and said at least one storage device comprising:

means for generating an active bit string for each of at least one process of said processes, wherein the active bit string comprises status information for the entries, and wherein the status information of an entry of said entries indicates readiness of the entry for further processing by said at least one process; and means for computing the status information by (i) comparing an entry index of the entry to an out-pointer to determine whether the entry index is greater than or equal to the out-pointer, (ii) comparing the entry index of the entry to an in-pointer to determine whether the entry index is less than the in-pointer;

(iii) determining whether a buffer wrap around in said storage device has occurred, and one of the comparing (i) and the comparing (ii) is true, and if so, setting the status information of the entry to a value which indicates said readiness of the entry for further processing by the at least one process; and (iv) determining whether the comparing (i) and the comparing (ii) are both true, and if so, setting the status information of the entry to a value which indicates said readiness of the entry for further processing by the at least one process.

15. The computer system of claim 14, wherein the status information of the entry indicates readiness of the entry for further processing by a process associated with the active bit string.

16. The computer system of claim 15, wherein the means for computing the status information further comprises maintaining an in-pointer and an out-pointer for each of said at least one process and wherein said comparing (i) utilizes a comparator, and said comparing (ii) utilizes a comparator.

* * * * *